United States Patent [19]

Sheffield

[11] Patent Number: 4,961,299
[45] Date of Patent: Oct. 9, 1990

[54] BASEBOARDS FOR USE AS PLAYBOARDS AND/OR DISPLAYS

[75] Inventor: Lance R. Sheffield, Sevenoaks, England

[73] Assignee: Sandpiper Computer & Model Services Limited, Kemsing, England

[21] Appl. No.: 301,655

[22] Filed: Jan. 25, 1989

[30] Foreign Application Priority Data

Jan. 28, 1988 [GB] United Kingdom ................. 8801932

[51] Int. Cl.⁵ ............................................. E04C 2/34
[52] U.S. Cl. ....................................... 52/806; 52/582; 428/73
[58] Field of Search ................. 52/582, 806, 583, 787, 52/802, 809, 807; 108/51.3; 403/331; 428/73, 76

[56] References Cited

U.S. PATENT DOCUMENTS

| 3,334,464 | 8/1967 | Charles | 52/809 |
| 3,587,479 | 6/1971 | Geschwender | 428/73 X |
| 3,709,161 | 1/1973 | Kauffman | 52/806 X |
| 3,731,956 | 5/1973 | Hanley | 52/582 |
| 3,786,613 | 1/1974 | Shepheard | 52/809 X |
| 3,798,852 | 3/1974 | Nicoll, Jr. | 52/806 X |
| 3,938,296 | 2/1976 | Weiss | 52/582 |
| 4,416,715 | 11/1983 | Schramm et al. | 428/76 X |

FOREIGN PATENT DOCUMENTS 20588 7/1918 France ................................. 52/807

Primary Examiner—Carl D. Friedman
Attorney, Agent, or Firm—Klauber & Jackson

[57] ABSTRACT

The invention provides a baseboard for use particularly, but not exclusively, as a playboard, as bases for model railway and other track layouts, and for displays, the baseboard comprising a core and a closed box structure surrounding and totally enclosing said core. The core, of an open-cell material, is provided with corner blocks of plastics material, and the edges of the core may be faced with strengthening material.

The box structure is formed from a one-piece blank of cardboard material, the blank carrying jointing components so that a plurality of baseboards may be removably connected together.

14 Claims, 8 Drawing Sheets

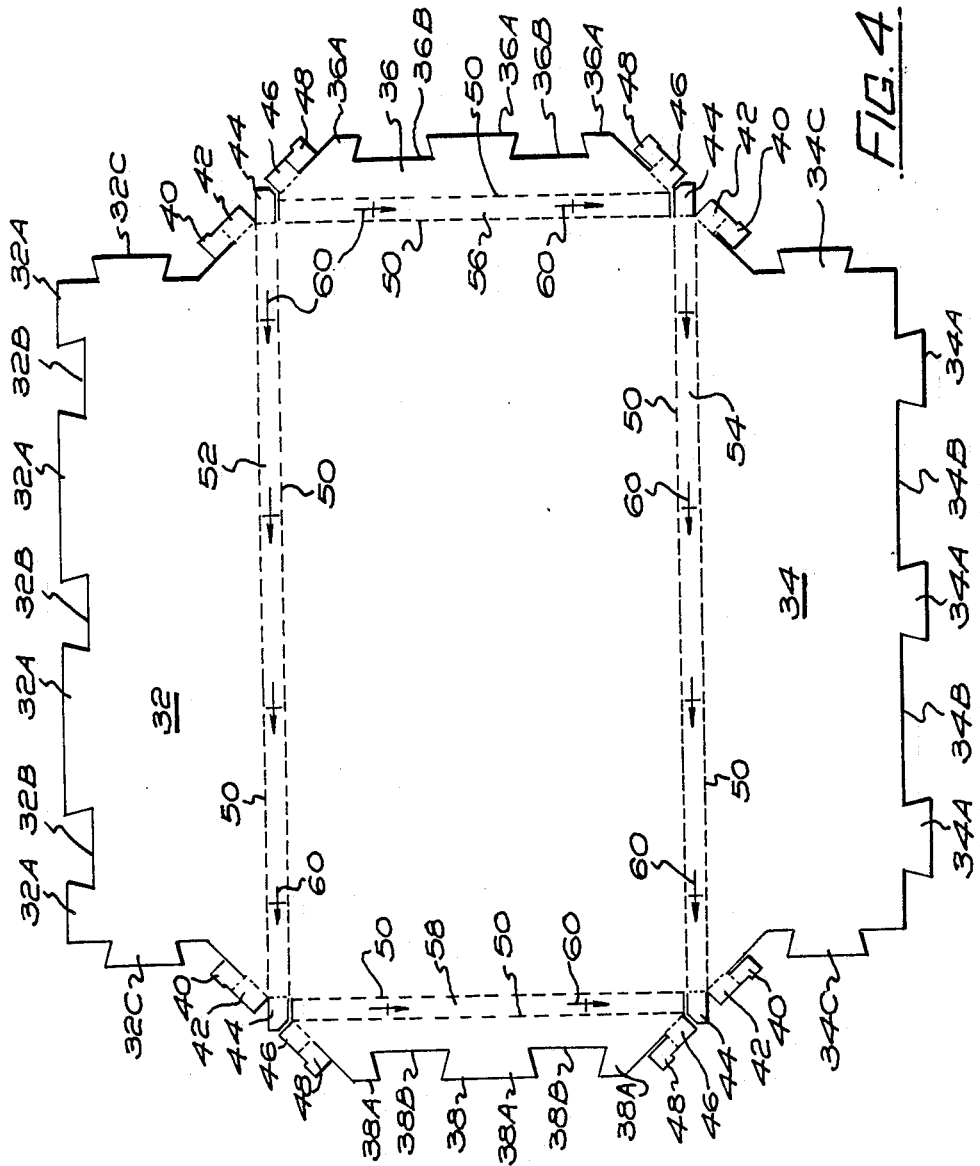

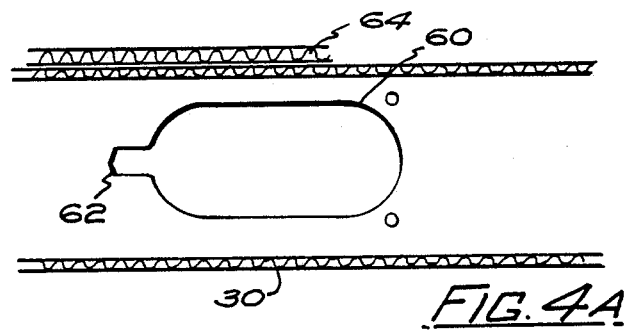
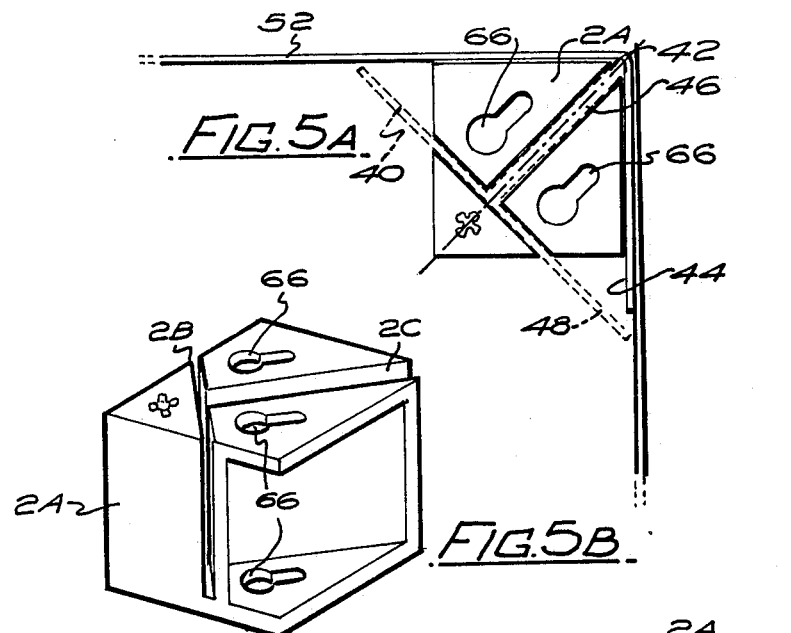
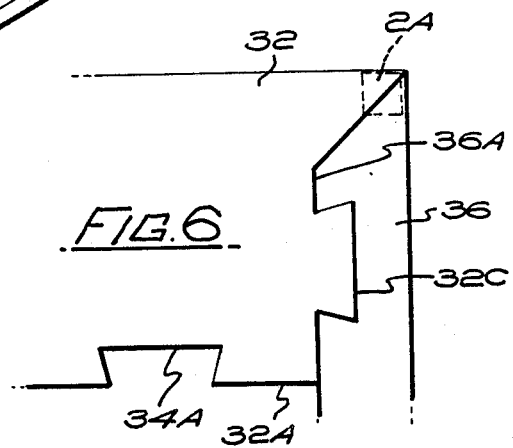

BASEBOARDS FOR USE AS PLAYBOARDS AND/OR DISPLAYS

This invention relates to baseboards, particularly but not exclusively for use as playboards, as bases for model railway and other track layouts, and for displays.

Baseboards according to the invention utilise the inherent strength of a corrugated cardboard box combined with an open cell core to produce a strong and rigid, yet light-weight board.

According to the present invention there is provided a baseboard comprising a core and a closed box structure surrounding and totally enclosing said core.

Preferably, said baseboard will include means to removably connect together a plurality of baseboards.

Said core may be formed of a honeycomb of cardboard material or it may be formed of foamed plastics material, and will be provided with corner blocks of plastics material.

Said core may be faced on its edges with lengths of plywood or other strengtnening material.

Said box structure will preferably be formed from a one-piece blank of cardboard material, panels of said one-piece blank interengaging with each other to surround and totally enclose said core.

The means to removably connect together a plurality of baseboards will preferably comprise a plurality of jointing components carried by said box structure, said jointing components each including a male portion and a female portion.

In order that the invention may be more readily understood, embodiments thereof will now be described, by way of example, reference being made to the accompanying drawings, wherein:

FIG. 4 is a plan view of a blank for a box structure forming part of the baseboard in accordance with the invention;

FIG. 4A is an enlarged view of one of the holes or apertures of the blank of FIG. 4;

FIGS. 5A and 5B are respectively a plan view and an isometric elevation of a corner block for use in connection with the baseboard of FIGS. 1 and 2;

FIG. 6 is a plan view of part of a box structure formed from the blank of FIG. 4;

Figure 1:
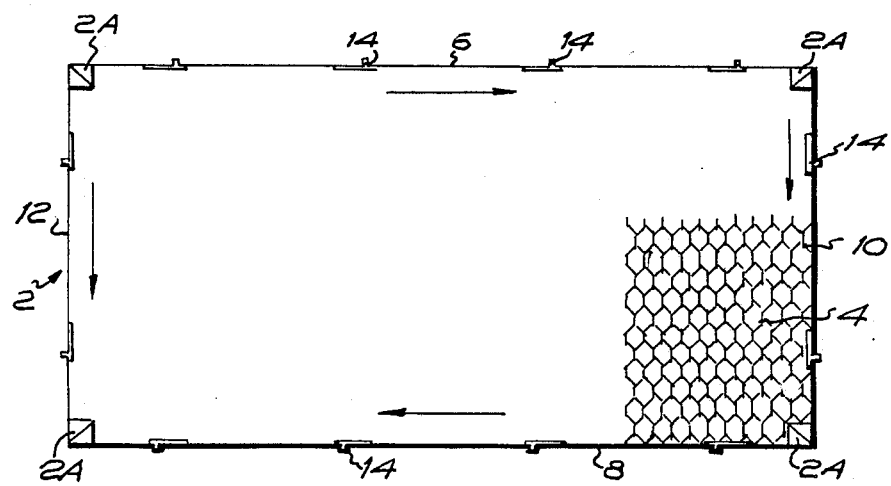
FIG. 1 is a plan view of a baseboard, partly cut away, in accordance with the invention.
Figure 2:
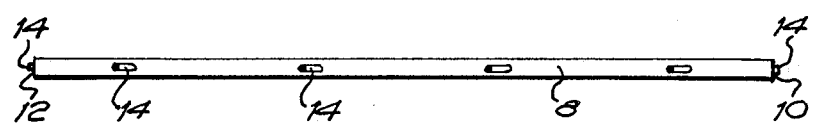
FIG. 2 is a front elevation of the baseboard shown in FIG. 1.

Referring to the drawings, and firstly to FIGS. 1 and 2, there is shown a baseboard indicated generally by reference numeral 2, the baseboard comprising a cardboard honeycomb core 4 and an outer box structure formed from the blank of FIG. 4.

Each of the four side faces of the baseboard 2—referenced 6, 8, 10, 12—is provided with a plurality of spaced-apart jointing components 14 which are located at predetermined intervals. Specifically, the jointing components are located at 250 mm centres in a baseboard size of 1000 mm by 500 mm, although it will be appreciated that these sizes may be varied. It will be seen from FIG. 1 that the jointing components 14 on one longer side of the baseboard 2 extend in an opposite direction to the jointing components on the other longer side, whilst the jointing components on the shorter sides of the baseboard extend in the same direction—see the arrows in FIG. 1.

The baseboard 2 is provided with four corner blocks 2A in order to strengthen the corners of the unit and to provide fixing points to enable the baseboard to be affixed to a wall or other surface—if required—as will be referred to hereinafter.

Baseboards incorporating cores as described are ideal for use as a base for model railway layouts and other layouts such as slot-car racing, and for farm yard and other bases and as a general play surface. They are also ideal for painting landscapes, and for use in display situations.

Figure 3A:
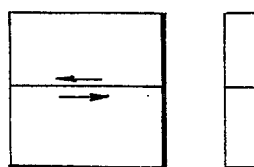
FIGS. 3A to 3G are views of differing arrangements utilising a plurality of baseboards in accordance with the invention.
Figure 3B:
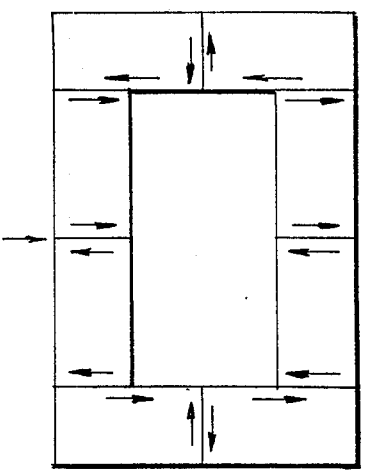
Figure 3C:
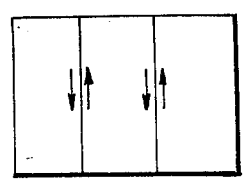

A plurality of baseboards may be connected together to form various layouts or arrangements by interconnecting the jointing components 14 on adjacent sides of juxtaposed baseboards, see for example the composite arrangements of baseboards of FIGS. 3A, 3B, and 3C. These arrangements are intended to be used flat for model railway and other layouts, for playing large games, and for completing large puzzles, and for use as general play surfaces in a variety of situations.

Figure 3D:
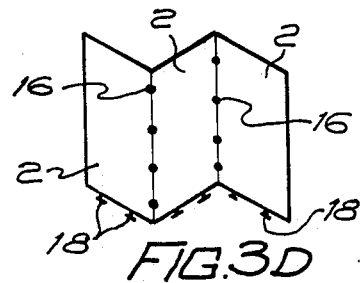
Figure 3E:
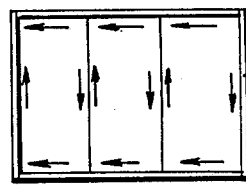
Figure 3G:
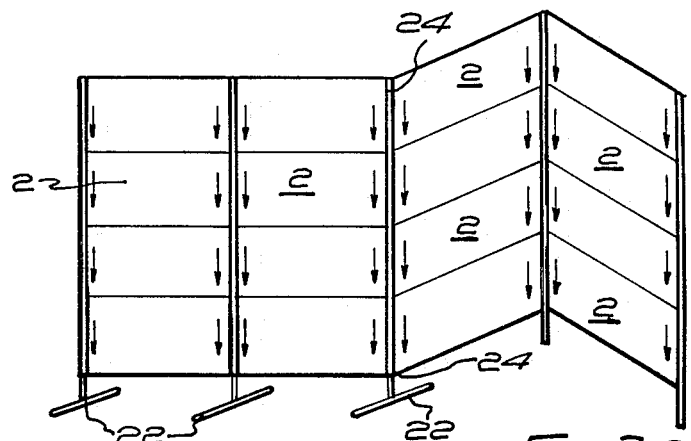
Figure 3F:
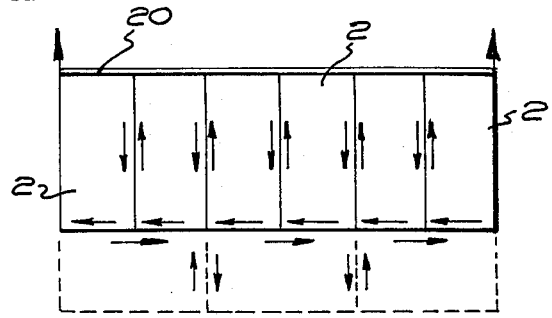
Figure 7:
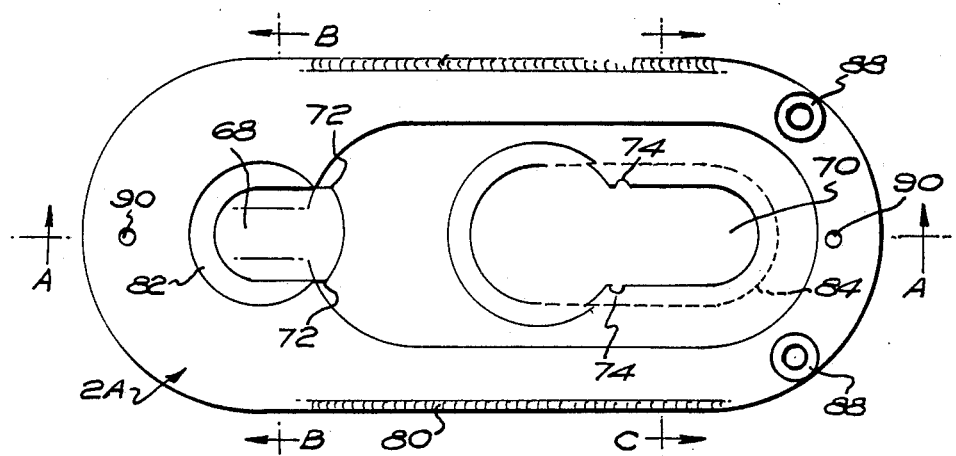
FIG. 7 is an enlarged view of one of the jointing components of FIGS. 1 and 2.
Figure 8:
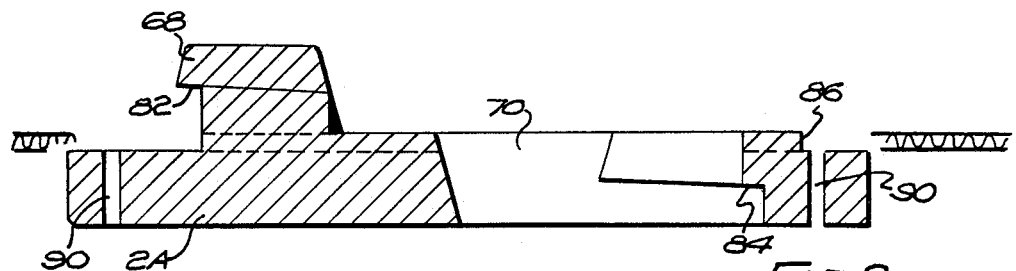
FIG. 8 is a sectional elevation of the jointing component of FIG. 7, the section being taken on line A—A of FIG. 7.
Figure 9:
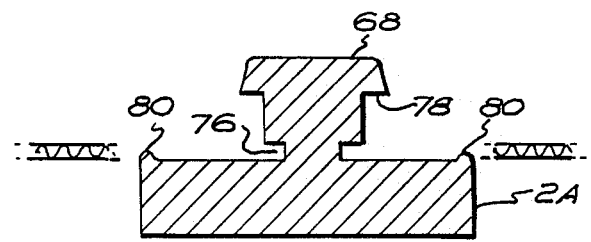
FIG. 9 is a sectional end elevation taken along line B—B of FIG. 7.
Figure 10:
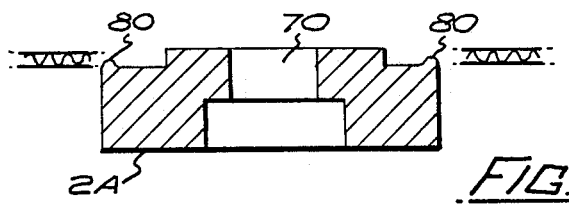
FIG. 10 is a sectional end elevation taken along line C—C of FIG. 7.
Figure 11:
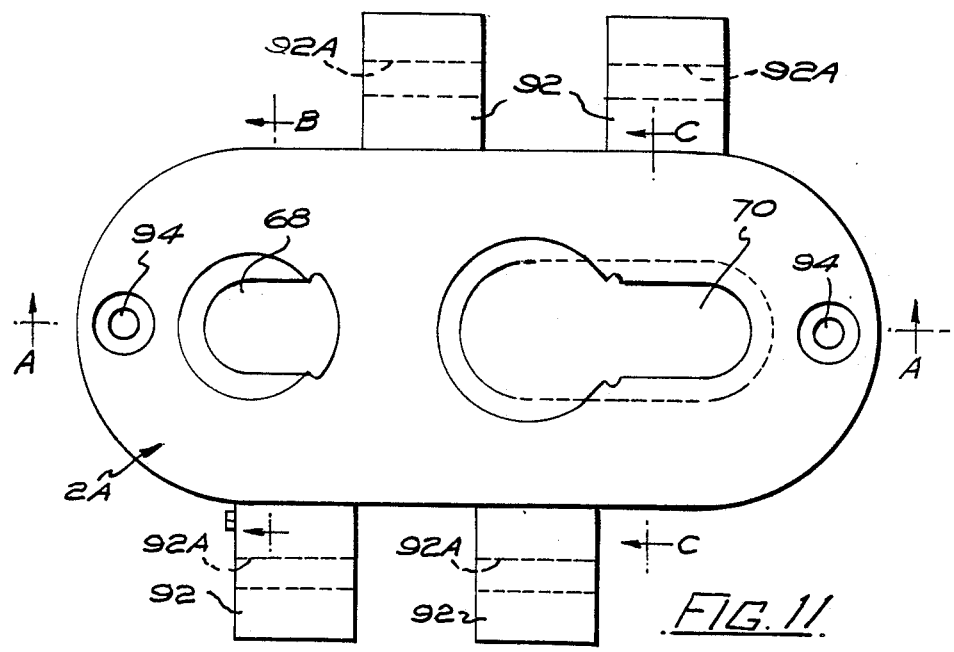
FIGS. 11 to 14 are views similar to those of FIGS. 7 to 10 but showing the jointing components as hinged components.
Figure 12:
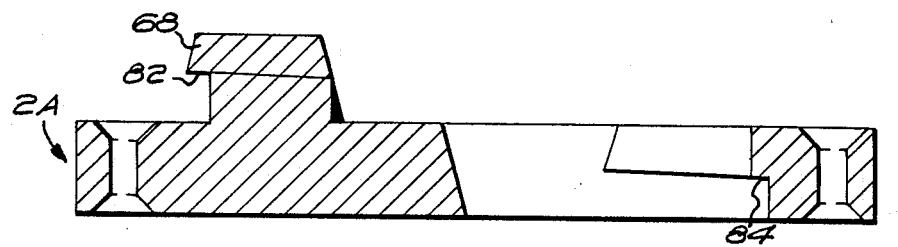
Figure 13:
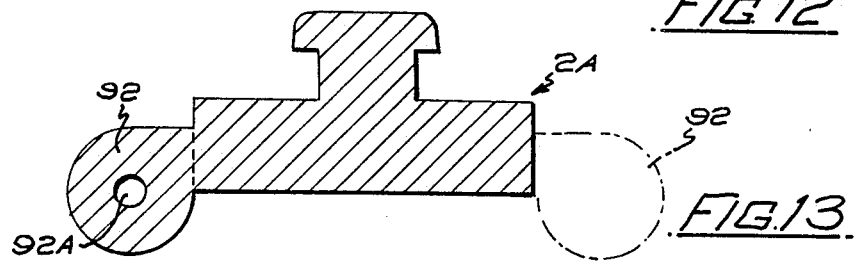
Figure 14:
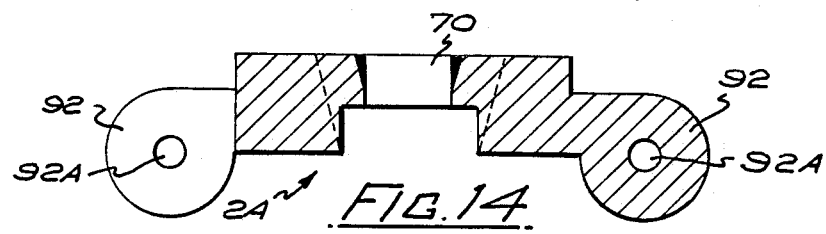

Hinges 16 and feet 18 (FIG. 3D) may be added to the arrangement of FIG. 3C to provide a table top or other free-standing display board, and aluminium or timber edge strips 26 may be added for greater strength—see FIG. 3E. An aluminium or other material strip 20 (FIG. 3F) may be added to a plurality of the baseboards 2 to provide extra support in a hanging display. FIG. 3G shows a larger free-standing display including the use of inverted T-shaped posts 22. Connector hinges 24 may be used so that the display may go round corners and to give the display greater stability, in which case the inverted T-shaped posts may be omitted.

The jointing components and other auxiliary items such as hinges, corner blocks, etc. will be described in greater detail later.

In order to form the baseboard 2 utilising the core 4 of FIG. 1, the core 4 is enclosed in a box structure which will be formed from the blank shown in FIG. 4. The blank of FIG. 4 comprises a main panel 30, interlocking panels 32, 34 and panels 36 and 38, as well as pluralities of corner tabs 40, 42, 44, 46, and 48. As will be seen, the blank is scored—as indicated by reference numerals 50—so that when the blank is folded along these score lines, the resultant box structure will have a depth suitable for accommodating the thickness of the core 4 of FIG. 1.

The outer edges of the panels 32, 34, 36, and 38 are provided with tabs and slots—respectively referenced 32A and 32B, 34A and 34B, 36A and 36B, and 38A and 38B—and the panels 32 and 34 are also provided with side tabs 32C and 34C respectively.

The areas of the blank bounded by the score lines 50, i.e. those parts of the blank marked 52, 54 and 56, 58, are each provided with a series of spaced-apart holes or apertures which are located at predetermined intervals indicated by the reference numerals 60, these holes or apertures being for receiving the jointing components 14. The holes or apertures 60 in the area 52 extend in opposite directions to the holes or apertures in the area 54 of the blank, whilst in the areas 56 and 58 the holes or apertures 60 extend in the same direction, such that the jointing components may extend in these directions as previously described. One of the holes or apertures 60 is shown in detail in FIG. 4A from which it will be seen that the hole or aperture is elongate and is provided with a restrictive slot 62 at one end thereof.

The blank of FIG. 4 is passed through a roller gluing machine to give an even layer of adhesive to the entire inner surface of the blank, the adhesive used being suitable for sticking both cardboard and the appropriate plastics material used for the jointing components and the corner blocks 2A.

The jointing components 14 are then slotted into the holes or apertures 60 and set home with slight pressure to overcome the resistance provided by the slight undercutting—to be described—on the face of the jointing component and to compress the corrugated card along the outer edges of the jointing components.

When the blank of FIG. 4, carrying the jointing components, is folded about the crease lines 50 to enclose a core unit 4, the tabs 32A, 34A and slots 32B, 34B of the panels 32 and 34 will interlock with each other, and the side tabs 32C and 34C of the panels 32 and 34 will interlock with the tabs 36A, 38A and slots 36B, 38B of the panels 36 and 38, the corner tabs 40, 42, 44, 46, and 48 having been folded inwardly along the cut and creased lines shown. A view of part of the folded box is shown in FIG. 6.

When folded as described, the blank forms a box structure to totally enclose and to be adhered to a core unit 4. Thereafter, a cover panel 64 (FIG. 4A) is glued and placed on the surface of the box structure comprised of the panels 32, 34, 36, and 38, in order to mask the intersections of the panels and to provide a smooth surface on that side of the baseboard, the other side of the baseboard being also smooth. The whole unit is then placed under slight pressure until the adhesive has achieved sufficient strength when the pressure is removed and the unit is gently dried with overall heat to prevent bowing and twisting of the resultant baseboard.

The corner blocks 2A, referring now to FIGS. 5A and 5B, are composed of one-piece plastics material and each incorporate a plurality of keyhole slots 66 for accommodating stacking supports when required. The corner blocks 2A are maintained in position relative to the core 4 when the blank is folded to form the box structure to enclose the core 4—see FIG. 6. From FIG. 5A, it will be seen that the tabs 40 and 48 engage in slot 2B of the corner block 2A, and that the tabs 42 and 46 engage in the slot 2C in order to maintain the corner block in the desired position.

Referring now to FIGS. 7 to 10, the jointing components 14 each comprise a plastics material moulding which is elongate as shown and which includes a male portion in the form of a tongue 68 and a female portion in the form of an aperture 70. The tongue 68 is provided with slight projections 72 which are adapted to engage in matching recesses 74 in order to form a positive connection between interengaging jointing components when baseboards are connected together. The tongue 68 is undercut at 76 and at 78 so as to provide engagement recesses for the cardboard of the box structure and to grip in the aperture of an engaging jointing component. The upper surface of the jointing component is provided with projections 80 so as to compress the cardboard and so afford a better grip, and a slight undercut 86 is provided in order to grip the cardboard when the jointing component is engaged in the appropriate hole or aperture.

The underside surface 82 of the tongue 68, as well as a surface 84 of the aperture 70 are slightly angled so as to increase the gripping effect between interconnecting jointing components when two baseboards are connected together.

The jointing components are maintained in position relative to the blank by passing self-tapping screws through holes 88 in the jointing component, and the jointing component is also provided with holes 90 to accommodate self-tapping screws to fix hinge units, when required.

The jointing components of FIGS. 11 to 14 are similar to those of FIGS. 7 to 10, but these components are provided with lugs 92 at either side or at both sides, each of the lugs having a hole or bore 92A to accommodate a loose pin. The jointing components of FIGS. 11 to 14 are modified to exclude the cardboard gripping projections and the undercuts, and instead of the holes 88 and 90 the components have holes 94 which are countersunk at both ends for screw-fixing the component to timber. The jointing component will be screwed from the rear when used as a hinge unit to provide positive fixing against gravity. Such jointing components would be used to form the display arrangements shown in FIGS. 3D and 3G of the accompanying drawings.

Figure 15:
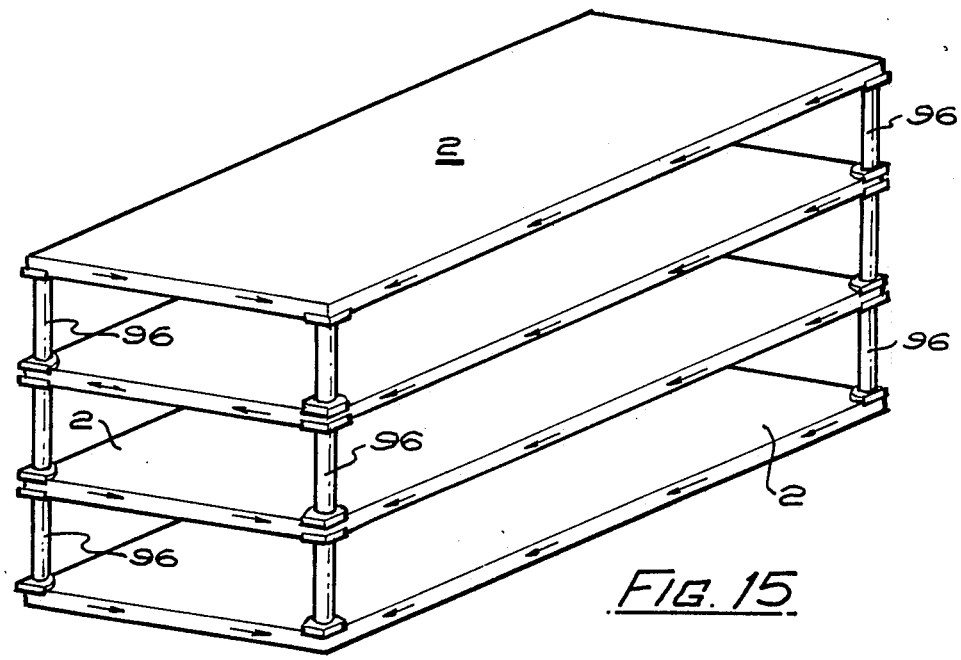
FIG. 15 is an isometric view of a stacking unit using a plurality of baseboards in accordance with the invention.
Figure 16:
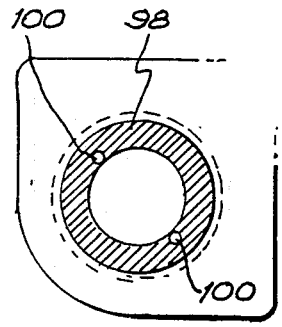
FIGS. 16 and 17 are enlarged detail views of parts of the unit shown in FIG. 15.
Figure 18:
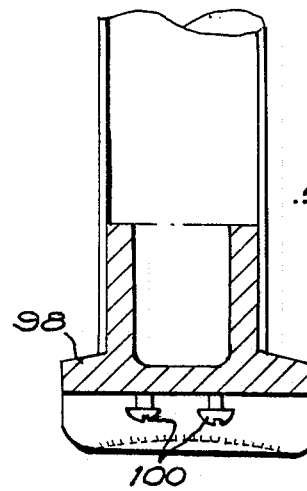
FIG. 18 shows to an enlarged scale a further detail of part of the unit of FIG. 15.
Figure 17:
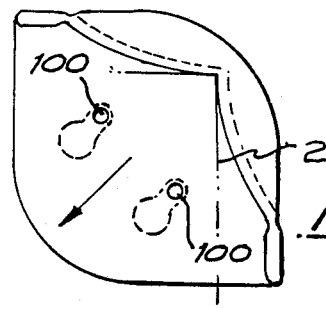

The stacking unit of FIG. 15 is formed by the use of a plurality of baseboards 2 and interposed spacer tubes 96, the spacer tubes carrying plugs 98 (FIGS. 16 and 18). The plugs 98 carry projecting screws or the like 100 which engage the keyhole slots 66 in the corner blocks 2A to connect the plugs to the relative baseboard 2. The screws or the like 100 may be inserted from the top, or the corner blocks may be modified so that the screws or the like may be inserted from the side.

Figure 19:
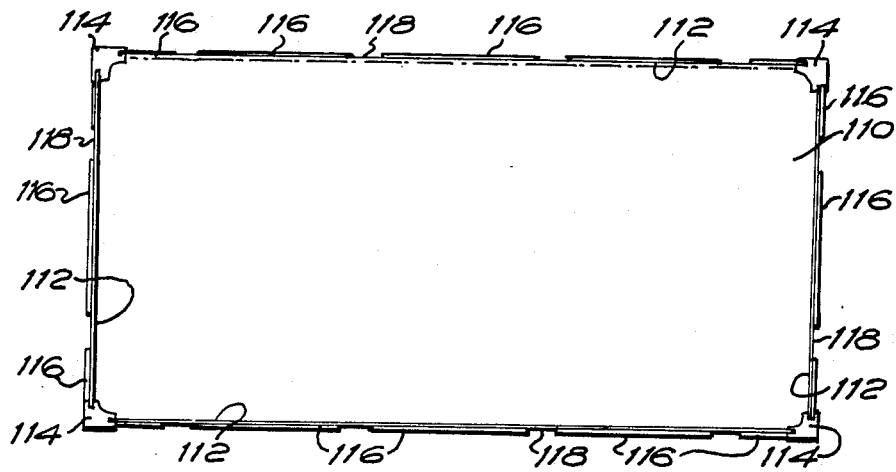
FIG. 19 is a plan view of a core according to an alternative embodiment of the invention.

Referring now to FIG. 19, the core 110 is faced on each of its four sides with lengths 112 of plywood which are secured to the core 110 by means of a suitable adhesive. It will be seen that the lengths 112 of plywood engage in the corner blocks 114 of the core 110 so as to maintain the corner blocks in the desired positions.

Figure 20:
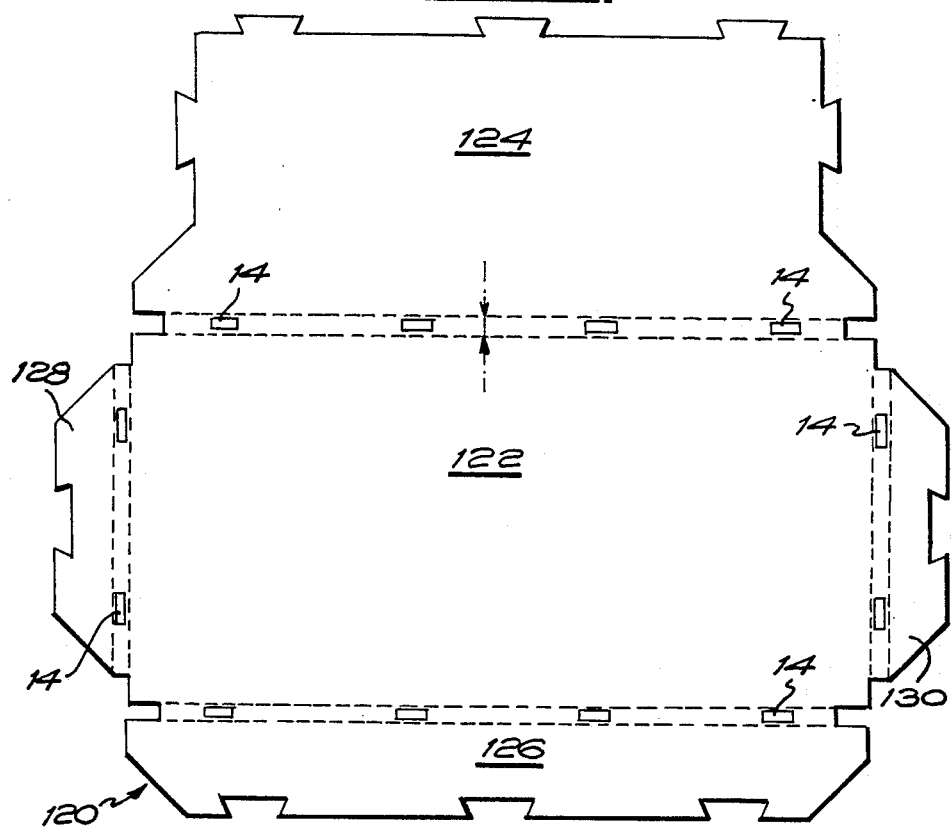
FIG. 20 is a plan view of a one-piece blank of cardboard material according to an alternative embodiment of the invention and for use with the core of FIG. 19.

Stapled or otherwise secured to the lengths 112 of plywood are strips 116 of plywood, spaces 118 being left to accommodate the jointing components 14 of the blank 120 of FIG. 20.

From FIG. 20 it will be seen that the blank 120 is somewhat different from the blank of FIG. 4, in that the blank 120 comprises a main panel 122, and interlocking panels 124, 126, 128, and 130, these panels being provided with tabs and slots to maintain the panels in their interlocked positions. The blank is creased as indicated by the dotted lines so that the blank may be folded to form the required box structure. As previously mentioned, the jointing components are positioned such that they may locate in the spaces of the core of FIG. 19.

It will be seen from FIG. 20 that the blank 120 does not have the pluralities of corner tabs as in the case of the blank of FIG. 4, thus making for a much simpler blank. Consequently, the corner blocks 114 (FIG. 19) may be made of simpler construction than those of FIGS. 5A and 5B.

When the blank 120 is folded about its crease lines to enclose the core 110, and after interengagement of the tabs and slots, a sheet or card may be applied to the box structure so as to conceal the joints of the box structure.

The provision of the lengths and strips of plywood make the resultant baseboard much less susceptible to warping and twisting.

To prevent accidental separation of units when used for display purposes, a small metal plate may be screwed to the baseboards at the corners thereof and into the corner blocks. This will also allow through screw fixing to walls when used on the extremity or extremities of a series of panels. For picture-type hanging, this can be achieved by using small screw eyes secured into the corner blocks.

For use as a timber connector, a similar item to the jointing component may be used, this timber connector being an injection moulded item but with no recess for the cardboard and with parallel back surface. The unit can be inset flush to the face of the timber and secured with two screws.

Ordinary drawing pins will not hold well on ordinary corrugated cardboard as there is very little side frictional resistance once the hole is formed. To overcome this problem, the adhesive used in the manufacture of the baseboards will be a rubber-based material that retains its resilience especially when protected from ultra violet light as in this situation. In order to make use of the strength of this adhesive material, special fixing pins are required which have serrated edges on opposing sides of the pin so as to enable the pin to be easily inserted through the board. Securing is obtained by twisting the pin through 90 degrees so that the serrations hold on to the adhesive layers. Removal without damaging the board is achieved by turning the pin through a further 90 degrees after which the pin can be removed through the original perforation. The head of the pin will preferably be shaped or marked to show direction of serrations.

Instead of using timber or aluminium for strengthening and other purposes, other materials such as Formica (R.T.M.) or other suitable materials may be used.

The outer surface of the baseboard will be a matt finish so as to make the board suitable for painting thereon with water colours and emulsions.

Timber, aluminium or other material may be fixed to the baseboard with PVA or hot-melt adhesive, or with balsa cement or impact adhesives etc.

Should triangular corner units be required in a layout, then standard baseboards can easily be cut with a sharp knife and the corner blocks cut with a suitable saw. The honeycomb core would be pushed back and a length of timber or other material inserted and secured with standard PVA or other adhesive. Any rough edges can be sanded and the affected area covered with a layer of paper or other surfacing material, again fixed with PVA or other adhesive, to match in with the remaining surfaces.

In order to provide a more superior baseboard, a better quality surfacing material, i.e. board, may be used. This will provide a semi-washable white surface suitable for use with felt-tipped pens or the like on one side with standard cardboard finish to the other side.

To the more superior board referred to above may be applied Nyloop (R.T.M.) material glued to the plain surface so that the baseboard may be used with Velcro (R.T.M.) pads or strips.

To the baseboards as described above, a further surfacing layer may be added to each side of the baseboard so as to give the board even more rigidity.

The corner blocks may be of other forms to those shown in the drawings, in that they could be modified so that the stacking units as described above may clip into the said corner blocks from the side instead of as hereinbefore described.

In addition, the core may be formed of foamed plastics material or other open-cell material, and the core may consist of two or more discrete pieces of material which together form a composite core.

Finally, it will be appreciated that the jointing components on the longer sides of the core may extend in the same direction instead of in opposite directions as described and illustrated in the drawings.

I claim:

1. A baseboard comprising:
   a core of open-cell material, said core having a plurality of corners, each corner having a cut-out section;
   a strengthening corner block in each said cut-out section, each said corner block having at least one slot therein;
   a closed box structure surrounding and totally enclosing said core; and
   retaining means engaging in said at least one slot in each corner block for retaining said corner blocks in said cut-out sections and in position relative to said core and said closed box structure.

2. A baseboard inaccordance with claim 1, in accordance means for removably connecting together a plurality of baseboards.

3. A baseboard in accordance with claim 2, wherein said means for removably connecting comprise a plurality of jointing components each including a male portion in the form of a tongue and a female portion in the form of an aperture.

4. A baseboard in accordance with claim 3, wherein said jointing components are formed as hinges so that connected baseboards may be moved relative to one another.

5. A baseboard in accordance with claim 3, wherein said jointing components are composed of plastics material.

6. A baseboard in accordance with claim 1, wherein said open-cell material is a honeycomb of cardboard material.

7. A baseboard in accordance with claim 1, wherein said open-cell material is a foamed plastics material.

8. A baseboard in accordance with claim 1, wherein said core has edges and is faced on said edges with lengths of strengthening material.

9. A baseboard in accordance with claim 8, wherein said retaining means includes said lengths which engage said corner blocks so as to maintain said corner blocks in position relative to said core.

10. A baseboard in accordance with claim 8, wherein said edges are additionally provided with strips of spaced-apart strengthening material.

11. A baseboard in accordance with claim 1, wherein said box structure is formed from a one-piece blank of cardboard material, said one-piece blank having panels interengaging with each other to surround and totally enclose said core.

12. A baseboard in accordance with claim 11, wherein said box structure is adhesively secured to said core.

13. A baseboard in accordance with claim 11, wherein said said blank carries connecting means for removably connecting together a plurality of baseboards.

14. A baseboard in accordance with claim 1, wherein said corner blocks are provided with slots to provide location for engagement means when a plurality of baseboards are arranged in stacked and vertically-spaced relationship.

* * * * *